Nov. 6, 1934.  H. NYQUIST  1,979,402
CONCENTRIC SHIELD FOR CABLES

Filed June 7, 1932

INVENTOR
H. Nyquist
BY
ATTORNEY

Patented Nov. 6, 1934

1,979,402

UNITED STATES PATENT OFFICE

1,979,402

CONCENTRIC SHIELD FOR CABLES

Harry Nyquist, Millburn, N. J., assignor to American Telephone and Telegraph Company, a corporation of New York Application June 7, 1932, Serial No. 615,918

1 Claim. (Cl. 179—78)

This invention relates to multi-conductor cables and has particular reference to arrangements for shielding certain of the conductors of such a cable from other conductors of the cable. This application is a continuation in part of my application, Serial No. 379,842, filed July 19, 1929, now Patent No. 1,871,906, granted Aug. 16, 1932.

In order to transmit currents of the same frequency in both directions within the same cable, and more particularly when the currents to be transmitted are of carrier frequencies, it is desirable that the conductors used for transmitting in one direction be shielded from those transmitting in the opposite direction. Accordingly, it is proposed to arrange the conductors of a cable in two concentric groups with a concentric shield between the two groups of conductors. In such an arrangement of the cable those conductors within the shield may all be used for transmitting carrier frequencies in one direction while the return channels for transmission in the opposite direction will be applied to the conductors in the other concentric group. The shield has the effect of reducing so-called "near end" crosstalk since the weak attenuated currents coming in at a repeater point are in a compartment of the cable shielded from the large amplified currents entering the conductors in the other compartment of the cable.

Preferably, the cable with the concentric shield is formed by arranging a group of conductors into a cylindrical bundle, spirally wrapping wide and thin tapes of soft iron alternated in layers with copper or other suitable material upon the cylindrical bundle of wires, and then mounting another group of wires, preferably equal in number, outside of the shielding tapes in the form of a concentric cylindrical bundle upon which the outer shield of lead or other material is applied in the usual manner. While various materials may be used, iron, and particularly soft iron, is preferred for one group of the alternating layers, because the product of the permeability by the conductivity of the iron is large, thereby making its attenuating effect large, and furthermore, the ratio of the permeability of the iron to its conductivity is quite different from that of the copper or other conductive material, which may be used for the other alternating layers, with the result that the reflection losses undergone by an interfering wave in penetrating through the shield are large.

Figure 1:
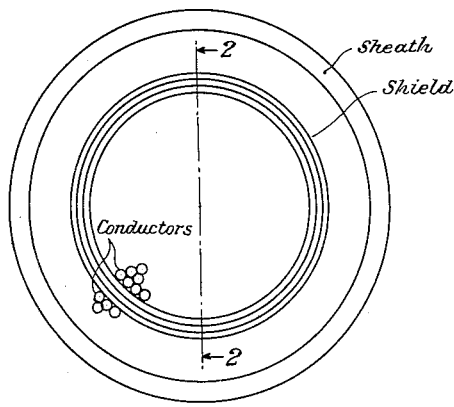
Figure 2:
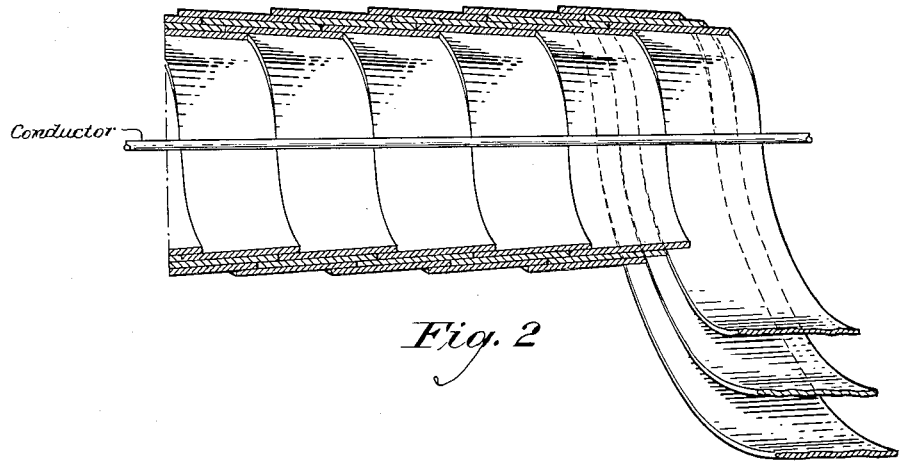

The invention will now be more fully understood from the following description, when read in connection with the accompanying drawing, Figure 1 of which is a transverse cross-section showing the relative positions of the sheath, the intermediate shield, and two groups of conductors (for simplicity only a few of the conductors are actually shown); and Figure 2 is a longitudinal section along the lines 2—2 of Figure 1, showing a portion of the layers of the shield unwrapped.

In order to design a proper shield for the purposes above set forth, and in order to give proper weight to the merits of different types of shields, it is desirable to have available a quantitative theory to give at least the first approximation of the shielding effects.

In case of low frequencies, the calculations of the shielding effects are simplified by the assumption that the currents in the shield distribute themselves uniformly and in phase. In the case of the higher carrier frequencies with which we are now concerned, this assumption is no longer permissible unless the shields are very thin. It is necessary to recognize that the energy is propagated through the shield in the form of electromagnetic waves which are propagated with a finite velocity. The differential equations for such electromagnetic waves are known accurately but the labor of integrating them in their accurate form is prohibitive. In the following discussion an approximate theory will be outlined which it is thought will be amply accurate for practical purposes.

The cable to be considered herein is made up of the usual cylindrical lead sheath within which the conductors are arranged in the usual fashion except that they are separated into two equal or substantially equal separate concentric groups by means of a cylindrical concentric shield. When a signal is transmitted over any circuit in this cable, it is permissible to consider an electromagnetic field as spreading out from this circuit in the form of a wave motion. This wave reaches other conductors and may induce currents and electromotive forces in other circuits unless they are perfectly balanced. The first of these circuits may be called the disturbing circuit and the other the disturbed. If the disturbing and disturbed circuit are on opposite sides of the shield, it is obvious that the disturbance is reduced due to the attenuation, and such reflections as may occur, in the shield.

The electromagnetic condition of a cable is given by specifying the electric and magnetic field both as to magnitude and direction at every point and at every instant. The problem will be greatly simplified by confining attention to one frequency component of these fields, that is to say, one of the components obtained by making a Fourier analysis of the fields over a sufficiently long time. It will be understood that this analysis is carried out at every point and relates to the directional components of the fields as well as to their magnitude. Having thus separated out one frequency component, the electric and magnetic vectors at any given point may have any one of several relations which will be discussed briefly in turn.

In the following discussion E is the electric field, H is the magnetic field, C the current density, $\mu$ the permeability, $\sigma$ the conductance, and $c$ is ratio of the electromagnetic unit of current to the electrostatic unit of current, or conversely it is the ratio of the electrostatic unit of E. M. F to the electromagnetic unit of E. M. F. These quantities are to be measured in electromagnetic units. It will be convenient to limit consideration to those waves which travel at right angles to the shield, that is to say, to those waves whose magnetic and electric fields are both parallel to the surface of the shield. These waves travel either directly toward or directly away from the shield. If they travel toward the shield, they suffer partial reflection at the surface which will be more fully discussed below. The portion which is not reflected is propagated through the shield and as it emerges at the other end it again suffers a partial reflection and the portion which is not reflected is transmitted into the compartment at the other side of the shield. The important thing is how much weaker the emerging beam is than the incident. The important contributing factors are the attenuation, which will be discussed first, and the reflections, which will be deferred for the time being.

1. *Attenuation of perpendicular wave in a plane metallic conductor*

While the shield is actually cylindrical, it will be permissible to consider a plane shield of the same thickness, as the error involved is very small unless the inner diameter of the shield is small in comparison with the outer one. It will be assumed that the shield is homogeneous and of uniform thickness.

For the time being, it will also be assumed that the waves are plane, polarized and infinite in extent. Inside of the conductor comprising the shield we are interested in two vectors in addition to the two fields, namely, the flux density $B=\mu H$ and the current density $C=\sigma E$. (The displacement current may be neglected in comparison with the conduction current in other words, the capacity of a cubic centimeter of the material may be neglected in comparison with its conductance.)

The manner in which the waves are propagated inside of the shield is determined by two well-known physical laws: (1) the law that the cutting of magnetic lines of force produces an electric field; and (2) the law that a current produces a magnetic field.

The mathematical expression for the first law in the form of a differential equation is, (where $t$ represents time), $$-dB/dt = \text{curl } E \qquad (1)$$

This equation represents the case where components of the field are propagated along three axes of a coordinate system. In the case we are considering of a plane wave plane polarized, this expression can be much simplified because the propagation is along a single axis. Let $z$ be the direction of propagation, $x$ the direction of the electric field and $y$ the direction of the magnetic field. Then Equation (1) reduces to $$-dB_y/dt = dE_x/dz \qquad (1a)$$

The subscripts $y$ and $x$ applied to B and E indicate the axes of the respective fields.

The second law referred to above according to which current produces a magnetic field, is given by the expression $$4\pi C = \text{curl } H \qquad (2)$$

which, in the case of the wave we are considering, reduces to $$4\pi C_x = -dH_y/dz \qquad (2a)$$

Substituting the value $\mu H$ and $\sigma E$ for B and C, respectively, in Equations (1a) and (2a) they become $$-\mu dH_y/dt = dE_x/dz \qquad (1b)$$

and $$4\pi\sigma E_x = -dH_y/dz \qquad (2b)$$

If $E_x$ is eliminated between these equations by differentiation of Equation (2b) with respect to $z$ and substituting, we have $$4\pi\sigma\mu dH_y/dt = d^2H_y/dz^2 \qquad (3)$$

Likewise, eliminating $H_y$ by differentiating Equation (1b) with respect to $z$ and Equation (2b) with respect to $t$, we have $$4\pi\sigma\mu dE_x/dt = d^2E_x/dz^2 \qquad (4)$$

The law of propagation of $H_y$ expressed in (3) is the same as the law of propagation of $E_x$ expressed in (4).

It may be shown that Equation (3) is equivalent to $$H_y = Me^{+i\omega t}e^{-Pz} \qquad (3a)$$

where M is a constant, $\omega$ is $2\pi$ times the frequency and P, the propagation constant, is given by the expression $$P = \alpha + i\beta = \sqrt{i4\pi\omega\sigma\mu} \qquad (5)$$

from which it follows, if $\sigma$ and $\mu$ are both real, that $$\alpha = \beta = \sqrt{2\pi\omega\sigma\mu} \qquad (5a)$$

$\alpha$ and $\beta$ being the attenuation constant and the wave constant, respectively.

Similarly it may be shown that Equation (4) is equivalent to $$E_x = Ne^{+i\omega t}e^{-Pz} \qquad (4a)$$

where N is also a constant and the other quantities have the same values as in Equation (3a).

In evaluating the expression for the attenuation constant $\alpha$ as given in Equation (5a), it should be remembered that the quantities are in electromagnetic units. For the permeability $\mu$ the ordinary numerical value which makes the permeability of air unity may be used. For the conductivity $\sigma$ it is necessary to take the numerical value as expressed in mhos per cm.³* and

*This means the conductance of a cube one centimeter each way.

multiply them by $10^{-9}$. With these values substituted, the attenuation will be given in nepers per cm. In order to express the attenuation in decibels ($db$) per inch, the attenuation constant obtained should be further multiplied by 8.69, the ratio of the neper to the decibel, and by 2.54, the ratio of the inch to the centimeter. The result thus obtained for copper is $$3.3\sqrt{f} db$$

per inch, where $f$ is expressed in cycles per second. For lead, the corresponding attenuation is approximately $$\sqrt{f}.$$

In the case of iron, the computation is complicated by the fact that the permeability is not real, that is to say, there is a hysteresis loop. It will be sufficient, in order to obtain a first approximation to the effect of hysteresis, to assume that the hysteresis loop is in the form of an ellipse, inclined to the axes in a similar manner to the hysteresis loop. Just as we say that the electrical admittance of a network having this kind of loop is a complex quantity $R+ix$, so we may say in the present case that $\mu = m - in$, where $m$ and $n$ are positive real quantities. The quantity $m$ is obtained by dividing the value of B, corresponding to the maximum value of H on the equivalent ellipse, by the maximum value of H; and $n$ is obtained by dividing the value of B, corresponding to $H=O$, by the maximum value of H. It is clear from a comparison of the expression $\mu = m - in$ with Formula (5) that the effect of hysteresis is to increase the attenuation $\alpha$ due to the component $m$ of the permeability, and decrease the wave constant $\beta$ due to the effect of the component $n$ of the permeability; in other words, to increase both the attenuation and the velocity.

Assuming that $n$ may be neglected and that an iron is available having a conductivity one-sixth that of copper and a permeability of 600, the attenuation would be ten times that of copper or $$33\sqrt{f} db$$

per inch.

2. *Oblique incidence*

We are still dealing with a large plane shield, and a plane and plane polarized wave, but the wave is propagated in a direction which is not perpendicular to the plane of the shield in the air. The direction of propagation within the shield is, however, substantially perpendicular to the plane of the shield. Upon entering the shield, the direction of the wave is altered; this follows from the fact that the velocity is very much less in the conductor than in the air. In the case of a wave of frequency of 40 kc., the velocity in copper is $8.4 \times 10^3$ cm. per second, whereas its velocity in air is $3 \times 10^{10}$ cm. per second. In other words, the velocity in air is about $3.6 \times 10^6$ times as great as in the metal. It will be obvious that a wave striking the metal even at a considerable angle to the normal will travel substantially parallel to the normal inside the metal. For this reason the attenuation of the wave is substantially the same regardless of whether the incidence of the wave is normal or oblique.

3. *Cylindrical shield*

Here it is convenient to introduce the principle known as Huygens' construction. In accordance with this construction the wave at any interior point of the shield can be looked upon as the resultant of a large number of small waves. At each point of the surface of the shield, we may consider that a small hemispherical wave is set up and spreads equally in all directions. When all these spherical wavelets are summed up at any interior point of a plane shield, values of $H_y$ and $E_x$ are obtained which are equal to those given in equations (3a) and (4a). This method of construction will also enable us to estimate the effect of a cylindrical shield. If the waves are traveling outward through the shield, the spherical waves that reach the outer surface do not reinforce one another to the same extent that they would if the shield were plane. In other words, the wave traveling outward is diminished slightly more than it would be in a plane shield. If the wave is traveling inward the opposite is true. This effect, however, which is an effect of spreading of the energy in the case of outgoing waves and a concentration in the case of incoming waves, exists whether the shield is present or not, and since we are particularly interested in the increase in attenuation which the shields produce, it will be permissible to use the figure obtained for a plane shield.

4. *Reflection in infinite space*

The space is assumed infinite in order to avoid consideration of multiple reflections which are bound to occur in any practical case. Moreover, both the wave and the shield are assumed to be plane and parallel to each other and the wave is plane polarized.

First consider the case of the reflection phenomena accompanying the incidence of the wave on the metal. Let the electric field in the incident wave be $E_{xi}$. Likewise let the electric field in the reflected wave be $E_{xr}$ and in the transmitted wave $E_{xt}$. Let $H_{yi}$, $H_{yr}$ and $H_{yt}$ be the corresponding magnetic fields. These fields are continuous in going from one medium to another and we have, therefore, $$E_{xi} + E_{xr} = E_{xt} \quad (6)$$

$$H_{yi} + H_{yr} = H_{yt} \quad (7)$$

From equations (2a) and (5) we have, designating the electric field within the conductor $E_{xt}$ and the magnetic field within the conductor $H_{yt}$, $$4\pi\sigma \, E_{xt} = P H_{yt} \quad (8)$$

The equations corresponding to (2a) and (1a) in air are $$(1/c^2) \, dE_x/dt = -dH_y/dz \quad (9)$$

$$-dH_y/dt = dE_x/dz \quad (10)$$

leading to the expressions $$E_{xi} = c \, H_{yi}, \text{ and} \quad (9a)$$

$$E_{xr} = -c \, H_{yr} \quad (10a)$$

Substituting for the E's in (6) the values given in (8), (9a) and (10a), equation (6) becomes $$cH_{yi} - cH_{yr} = \sqrt{i\omega\mu/4\pi\sigma} H_{yt} \quad (6a)$$

Solving the simultaneous equations (6a) and (7) in terms of $H_{yt}$ and $H_{yr}$, respectively, we get $$H_{yt} = \{2c/(c+\sqrt{i\omega\mu/4\pi\sigma})\} H_{yi} \quad (11)$$

$$H_{yr} = \{(c-\sqrt{i\omega\mu/4\pi\sigma})/(c+\sqrt{i\omega\mu/4\pi\sigma})\} H_{yi} \quad (12)$$

Substituting in (11) and (12) the expression for H's in terms of the E's given in (8), (9a) and (10a)

$$E_{xr} = -\{(c-\sqrt{i\omega\mu/4\pi\sigma})/(c+\sqrt{i\omega\mu/4\pi\sigma})\} E_{xi} \quad (12a)$$

$$E_{xt} = \{2\sqrt{i\omega\mu/4\pi\sigma}/(c+\sqrt{i\omega\mu/4\pi\sigma})\} E_{xi} \quad (11a)$$

To state the foregoing in words, since the term $$\sqrt{i\omega\mu/4\pi\sigma}$$

is small, equations (12) and (12a) mean that the reflected wave is substantially equal to the incident wave; equation (11) indicates that the entering wave has substantially twice the magnetic fields of the incident wave; and equation (11a) shows that the entering wave has its electric field multiplied by the small factor $$\sqrt{i\omega\mu/\pi\sigma}/c$$

(about). In copper this fraction is about $4 \times 10^{-7}$ at 40 kc.

These are the relations for the wave entering the conductor. On leaving the conductor there is a similar reflection phenomenon. It will be seen that the expressions for the reflected and transmitted wave are obtained from (11), (11a), (12) and (12a) by interchanging the two quantities $c$ and $$\sqrt{i\omega\mu/4\pi\sigma}.$$

In particular it will be seen that the electric field is multiplied by 2 and the magnetic field by $4 \times 10^{-7}$. The net result of the two reflections is to multiply both the electric and the magnetic fields by $8 \times 10^{-7}$, which corresponds to a reflection loss of about 120 $db$ for the combined effect of entering and leaving a copper shield.

5. Multiplicity of surfaces

From the result just obtained it would at first appear that reflections necessarily play an important part in reducing the intensity of the wave. It might even be thought that the artificial production of reflections obtained by separating successive shields by an air space would be beneficial. This, however, is not the case.

Consider the situation where two shields are separated by a distance of one cm. The wave strikes the first shield and is in large measure reflected and in part transmitted. The transmitted wave penetrates the shield with attenuation and at the opposite surface of the shield is in part reflected and in part transmitted into the air space. The reflected wave travels very slowly back through the metal and may be left for the moment while we follow the wave which is transmitted. Consider its electric field, $(E_x)$. If the electric field of the incident wave (at this second reflection) be assumed to have a value 1, the value of the reflected wave is also about 1 and that of the transmitted wave about 2. The transmitted wave crosses the one cm. air space between the shields without attenuation and with very little phase shift. When it strikes the second shield it is in part reflected and in part transmitted. The reflected wave is almost as great as the incident but not quite, having lost a small fraction which goes into the transmitted wave. The reflected wave returns to the first shield where its electric field is again diminished by a small amount; however, the main portion is reflected to the second shield again. Thus there is a large number of successive reflections and at each reflection the wave gives up a portion of its electric field to one or the other of the shields. Due to the small phase shift involved these increments in electric field transmitted to the shields add substantially in phase. Now the original value of the wave transmitted through the air is 2. The two waves built up in the two conductors as a result of the multiple reflections are each of magnitude one. In other words each is equal to the incident wave before emerging from the first shield. The wave thus built up in the second shield is therefore of the same strength as it would have been if there had been no air gap.

Now consider the wave of value 1 built up in the first shield. This is the result of the odd numbered reflections and therefore the electric field is reversed in phase. Before this wave proceeds back into the first shield it combines with the original reflected wave (of value 1) which we previously left being slowly propagated back through the first shield. As both waves are substantially equal the net result by way of a wave returned into the first shield is substantially zero. It will be apparent then that the air space is of substantially no effect.

If, however, the intervening space had caused considerable phase shift or if it had produced even a relatively small amount of attenuation, its effect would have been appreciable. In particular it would seem that if two different metals having different ratios $\mu/\sigma$ are used for making up the shield, they should be alternated in relatively thin layers to take advantage of the reflections at their adjoining surfaces. The significance of the ratio $\mu/\sigma$ is clear from equations (11), (11a), (12), and (12a) which show that the relative values of the transmitted and reflected waves are functions of $i\omega\, \mu/4\pi\, \sigma$ and hence of the ratio of permeability $\mu$ to conductivity $\sigma$.

6. Reflection at oblique incidence

The computation of the reflection coefficient at oblique incidence is more difficult than the corresponding computations for normal incidence as given under heading 4. Moreover it turned out (see heading 5) that when the reflection coefficients had been found for the case of normal incidence they had no appreciable bearing on the effect produced by the shield. It may, therefore, be reasonably questioned whether it is worth while to carry out the computations for the case of oblique incidence. In any event it can be seen from physical considerations that the reflection coefficients and reflection losses do not differ in kind but merely in degree from those obtained for normal incidence. This being the case the same general arguments as were used above can be employed to show that the reflections at two surfaces separated by an air space are substantially cancelled out in the case of oblique incidence, as well as in the case of normal incidence.

7. Design of shield

There will now be described a shield construction suitable for separating two concentric groups of conductors within a cable. As has already been made clear, the purpose of the shield is to reduce crosstalk between circuits in the two compartments separated by the shield. The general construction of the cable and location of the shield are indicated in the figures of the accompanying drawing.

The attenuation of a solid shield is equal to the thickness times the attenuation constant $\alpha$. In accordance with equation (5a) the attenuation constant is given by the expression $$\sqrt{2\pi\omega\sigma\mu}$$

where $\sigma$ and $\mu$ are the conductivity and permeability, respectively, in electromagnetic units. In order to make the attenuation of each layer of the shield as great as possible for a given thickness, it is desirable, therefore, that the product $\mu\, \sigma$ be as large as possible. It is also desirable that the quotient $\mu/\sigma$ for alternate layers of the shield differ as much as possible from the corresponding quotient for the intervening layers. This insures a certain reflection loss in the shield in addition to the attenuation loss, because the amount of reflection at each interface depends on a difference in the values of the quotient for the materials on the two sides, as already explained under heading 5. Each layer should also be thick enough, so that a wave transmitted through it suffers a phase shift of a radian or more, or an attenuation at least of the order of a neper or more, to prevent mutual cancellation of the reflections from the surface of that layer, as also previously discussed.

In comparing various substances that might be available for the two materials in the alternating layers, the points to be kept in mind are that for both materials the product $\mu\sigma$ should be as large as possible and that the ratio $\mu/\sigma$ should be as much different as possible from one material to the other. The best non-magnetic substances are copper, silver and aluminum. There is very little choice in performance among these three. Taking copper as representative and comparing it with, say, iron, it is found that the conductivity $\sigma$ is decreased in the ratio of 6:1 in going from copper to iron. Further, the permeability $\mu$ is increased in a very much greater ratio, possibly as much as 600:1. If we assume the latter figure the product $\sigma\mu$ is increased in the ratio of 100:1 which means that the attenuation constant $\alpha$ is increased in the ratio of 10:1 and the required thickness of shield for a given attenuation is decreased in the ratio 1:10. In addition the ratio $\mu/\sigma$ is increased in a ratio of about 3600:1 in going from copper to iron, and there is, therefore, a substantial reflection loss. For both of these reasons it seems, therefore, that iron should be alternated with copper.

From a mechanical standpoint it seems that the most practicable way of applying the shield is to make it in the form of a tape and wind it around the inner core of conductors.

The figures on the drawing show the construction contemplated. Fig. 1 shows the location of the shield with respect to the remainder of the cable. Fig. 2 is a longitudinal cross-section of the shield showing the inside appearance of the shield and a portion of its layers unwrapped. In order to make the interior appearance clear, all of the conductors but one have been removed from the inside in this figure.

It will be obvious that the general principles herein disclosed may be embodied in many other organizations widely different from those illustrated, without departing from the spirit of the invention as defined in the following claim.

What is claimed is:

In a system for protecting one conductor in a cable from the inductive effect of another conductor therein comprising a shield positioned between the said conductors, the said shield having at least two contiguous layers of dissimilar materials, one characterized by a high ratio of permeability to conductivity and the other by a low ratio of permeability to conductivity but each characterized by a large product of permeability and conductivity, the method which consists in reflecting from that surface of the shield nearer to the source of the disturbing wave a portion of the said wave, transmitting the remainder of the said wave through the first layer of the shield and attenuating the said wave during such transmission, reflecting a portion of the said attenuated wave from the junction between the said layers and transmitting to the second layer that portion of the wave not reflected, then attenuating by and within the said second layer the portion of the wave transmitted to that layer and reflecting a part of the said wave from the outer surface of the said second layer.

HARRY NYQUIST.